United States Patent
Muhlestein

(10) Patent No.: US 6,279,011 B1
(45) Date of Patent: Aug. 21, 2001

(54) BACKUP AND RESTORE FOR HETEROGENEOUS FILE SERVER ENVIRONMENT

(75) Inventor: Mark Muhlestein, Morgan Hill, CA (US)

(73) Assignee: Network Appliance, Inc., Sunnyvale, CA (US)

(*) Notice: Subject to any disclaimer, the term of this patent is extended or adjusted under 35 U.S.C. 154(b) by 0 days.

(21) Appl. No.: 09/099,844

(22) Filed: Jun. 19, 1998

(51) Int. Cl.[7] ........................................ G06F 17/30
(52) U.S. Cl. ..................... 707/204; 707/205; 711/162; 714/5; 714/6
(58) Field of Search .............................. 707/10, 200–205; 709/104; 714/5, 6, 4, 8; 711/161, 162

(56) References Cited

U.S. PATENT DOCUMENTS

| | | | |
|---|---|---|---|
| 4,825,354 | 4/1989 | Agrawal et al. | 364/200 |
| 4,937,763 | 6/1990 | Mott | 364/550 |
| 4,984,272 | 1/1991 | McIlroy et al. | 380/25 |
| 5,067,099 | 11/1991 | McCown et al. | 364/550 |
| 5,113,442 | 5/1992 | Moir | 380/25 |
| 5,144,659 | 9/1992 | Jones | 380/4 |
| 5,202,983 | 4/1993 | Orita et al. | 395/600 |
| 5,222,217 | 6/1993 | Blount et al. | 395/325 |
| 5,261,051 | 11/1993 | Masden et al. | . |

(List continued on next page.)

FOREIGN PATENT DOCUMENTS

| | | |
|---|---|---|
| 0306244A2 | 3/1989 | (EP) . |
| 0308056A2 | 3/1989 | (EP) . |
| 0410630A | 1/1991 | (EP) . |

(List continued on next page.)

OTHER PUBLICATIONS

R. Nass: Connect Disk Arrays to Eisa or PCI Buses Electronic Design, vol. 41, No. 23, Nov. 1993, Cleveland, OH, USA pp. 152–154, XP000417908 see p. 152–p. 153, right–hand column, line 10.

Borr A J: "SecureShare: safe Unix/Windows file sharing through multiprotocol locking" Proceeding of the 2nd Usenix Windows NT Symposiom, proceedings of 2nd Usenix Windows NT Symposiom, Seattle, WA, USA, Aug., 3–5, 1998, pp. 117–126, XP002097387 ISBN 1–880446–95–2, 1998, Berkeley, CA, USA, Usenix Assoc. USA.

(List continued on next page.)

*Primary Examiner*—Hosain T. Alam
(74) *Attorney, Agent, or Firm*—Swernofsky Law Group

(57) ABSTRACT

The invention provides a file server that provides for backup and restore of files in a heterogeneous file server environment. Metadata associated with each file by each model or protocol is preserved across backup and restore operations. The file server performs at least three tasks as part of the backup and restore operations. The file server notes all file attributes associated with each file in either model. These file attributes can include Unix perms, ownership and timestamp information, and link information. On backup, the file server records those file attributes in an analogous record using a different model. The file server records each element of Unix metadata as an NT Extended Attribute for use by an NT backup element. On restore, the file server restores those file attributes from the analogous record. The NT Extended Attributes provided by an NT restore element are translated into Unix metadata. The file server provides an element for translating between Unix metadata and NT Extended Attributes transparently to the NT backup and restore elements, so that NT backup and restore elements that were created without reference to the heterogeneous file server environment can be used.

13 Claims, 2 Drawing Sheets

U.S. PATENT DOCUMENTS

| | | | |
|---|---|---|---|
| 5,283,830 | 2/1994 | Hinsley et al. | 380/25 |
| 5,504,883 | 4/1996 | Coverston et al. . | |
| 5,572,711 | 11/1996 | Hirsch et al. | 395/500 |
| 5,604,862 | 2/1997 | Midgely et al. | 395/182.04 |
| 5,617,568 | 4/1997 | Ault et al. | 395/612 |
| 5,649,152 | 7/1997 | Ohran et al. | 395/441 |
| 5,649,196 | 7/1997 | Woodhill et al. | 395/620 |
| 5,668,958 | 9/1997 | Bendert et al. | 710/128 |
| 5,675,726 | 10/1997 | Hohenstein et al. . | |
| 5,675,782 | 10/1997 | Montague et al. . | |
| 5,689,701 | 11/1997 | Ault et al. | 395/610 |
| 5,720,029 | 2/1998 | Kern et al. . | |
| 5,721,916 | 2/1998 | Pardikar | 395/617 |
| 5,737,523 | 4/1998 | Callaghan et al. | 395/187.01 |
| 5,737,744 | 4/1998 | Callison et al. . | |
| 5,742,752 | 4/1998 | DeKoning . | |
| 5,761,669 | 6/1998 | Montague et al. | 707/103 |
| 5,819,292 | 10/1998 | Hitz et al. | 707/203 |
| 5,819,310 | 10/1998 | Vishlitzky | 711/114 |
| 5,825,877 | 10/1998 | Dan et al. | 380/4 |
| 5,835,953 | 11/1998 | Ohran | 711/162 |
| 5,876,278 | 3/1999 | Cheng | 454/184 |
| 5,890,959 | 4/1999 | Pettit et al. | 454/184 |
| 5,907,672 * | 5/1999 | Matze et al. | 714/8 |
| 5,915,087 | 6/1999 | Hammond et al. | 395/187.01 |
| 5,931,935 | 8/1999 | Calbrera et al. | 710/260 |
| 5,950,203 * | 9/1999 | Stakuis et al. | 707/10 |
| 5,963,962 | 10/1999 | Hitz et al. | 707/202 |
| 5,996,086 | 11/1999 | Delaney et al. | 714/4 |
| 5,999,943 | 12/1999 | Nori et al. | 707/104 |

FOREIGN PATENT DOCUMENTS

| | | | |
|---|---|---|---|
| 0 477 039 A | 3/1992 | (EP) . | |
| 0537098 | 4/1993 | (EP) . | |
| 0566967A | 10/1993 | (EP) . | |
| 629956 A2 | 12/1994 | (EP) . | |
| 629956 A3 | 12/1994 | (EP) . | |
| 747829 A | 12/1996 | (EP) . | |
| 756235 A | 1/1997 | (EP) . | |
| 0760503A1 | 3/1997 | (EP) . | |
| 1-273395 | 11/1989 | (JP) | 361/695 |
| 5146588 A | 9/1992 | (US) . | |
| 5335235 A | 8/1994 | (US) . | |
| WO 9821656 A | 5/1998 | (WO) . | |

OTHER PUBLICATIONS

Tanner J: " CIFS: Common Internet File System" Unix Review, vol. 31, Feb. 1997, pp. 31/32, 34, XPOOO783952 see whole document, relevant to claim No. 1–38.

R. Reichel: "Inside Windows NT Security: Part 1" Windows/DOS Developers' Journal, vol. 4, No. 4, Apr. 1993, pp. 6–19, XP002107445, Lawrence, Ks, USA.

"Mapping the VM text files to the AIX text files", IBM Technical Disclosure Bulletin., vol. 33, No. 2, Jul. 1990, p. 341 XP000123641, IBM Corp. New York., US ISSN: 0018–8689 —the whole document.

"Migrated Data Backup Utility", IBM Technical Disclosure Bulletin., vol. 37, No. 06B, Jun. 1994, pp. 505–507, XP000456079, IBM Corp. New York., US. ISSN: 0018–8689.

* cited by examiner

BACKUP AND RESTORE FOR HETEROGENEOUS FILE SERVER ENVIRONMENT

BACKGROUND OF THE INVENTION

1. Field of the Invention

The invention relates to storage systems.

2. Related Art

A file servers is a computer storage systems that is used to record and retrieve data, in response to requests made by client devices; these client devices are typically coupled to one or more file servers using a communication network. The file server receives requests formatted in a file server protocol and following a data storage and retrieval model that is suited to that protocol. (In many circumstances the file server protocol and the data storage and retrieval model are nearly inseparable.)

Because different client devices often use differing data storage and retrieval models, or differing file server protocols, it is desirable for the file server to provide services using a plurality of such models and protocols. One such model is the Unix file system, with the associated NFS (Network File System) protocol. Other file systems include the Windows NT file system, with the associated CIFS (Common Internet File System) protocol.

One problem that has arisen in the art is that certain functions the file server should advantageously perform, such as backup and restore, differ substantially between differing models and protocols. It would be advantageous for the file server to perform these functions for files using either model, while preserving all the information associated with the file in either model. In particular, this poses a problem because some of the metadata associated with files in the Unix file system is not represented in the Windows NT file system.

Accordingly, it would be advantageous to provide a file server that provides for backup and restore of files in a heterogeneous file server environment, in which metadata associated with each file by each model or protocol is preserved across backup and restore operations. This advantage is achieved in an embodiment of the invention in which the file server (a) notes all file attributes associated with each file; (b) records those file attributes in an analogous record on backup using a different model; and (c) restores those file attributes from the analogous record on a restore operation.

SUMMARY OF THE INVENTION

The invention provides a file server that provides for backup and restore of files in a heterogeneous file server environment. Metadata associated with each file by each model or protocol is preserved across backup and restore operations. The file server performs at least three tasks as part of the backup and restore operations. The file server notes all file attributes associated with each file in either model. In a preferred embodiment, these file attributes can include Unix perms, ownership and timestamp information, and link information. On backup, the file server records those file attributes in an analogous record using a different model. In a preferred embodiment, the file server records each element of Unix metadata as an NT Extended Attribute for use by an NT backup element. On restore, the file server restores those file attributes from the analogous record. In a preferred embodiment, the NT Extended Attributes provided by an NT restore element are translated into Unix metadata.

In a preferred embodiment, the file server provides an element for translating between Unix metadata and NT Extended Attributes transparently to the NT backup and restore elements, so that NT backup and restore elements that were created without reference to the heterogeneous file server environment can be used.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, and that implementation of the preferred process steps and data structures described herein using such equipment would not require undue experimentation or further invention.

System Elements

Figure 1:
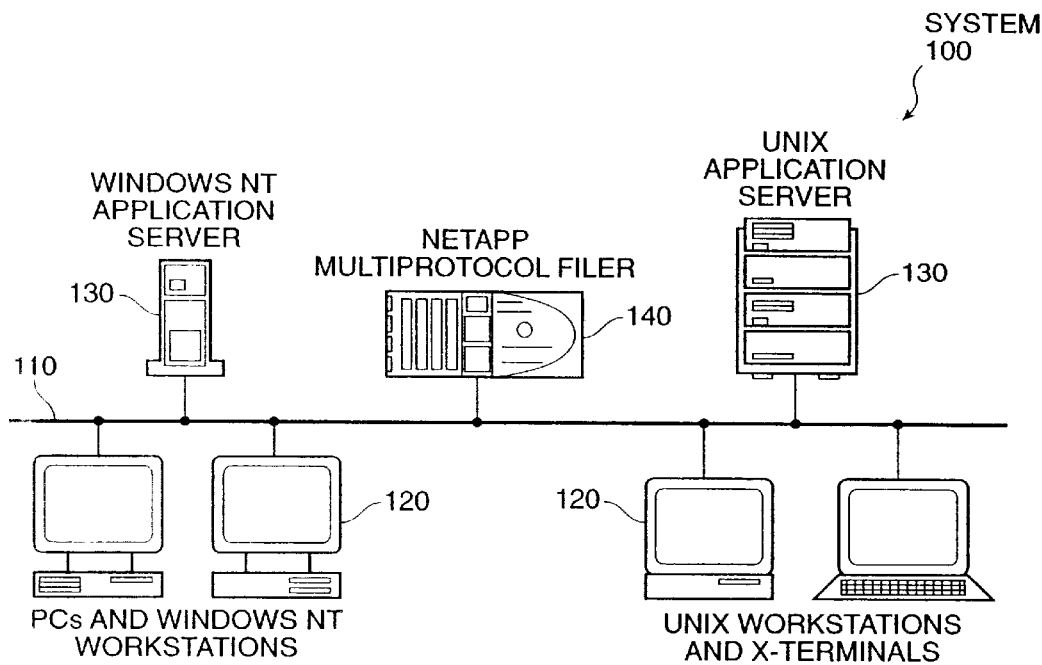
FIG. 1 shows a block diagram of a file server system providing backup and restore in a heterogeneous environment.

FIG. 1 shows a block diagram of a file server system in a heterogeneous environment.

A system 100 includes a communication network 110, a set of NT workstations 120, a set of Unix workstations 120, an NT application server 130, a Unix application server 130, and a multi-protocol file server 140.

The communication network 110 can include a LAN (local area network) or other communication structure or technique for coupling the workstations 120, the application servers, and the file server 140.

The workstations 120 include devices that take the role of client device in a client-server model of application use and file storage. NT workstations 120 can be PC devices using the "Windows 95" operating system, the Windows NT operating system, or another variant of the "Windows" operating system. Unix workstations 120 can be devices using any variant of the Unix operating system, or other operating systems bearing sufficient similarity to Unix to interoperate therewith.

The application servers 130 can be general-purpose or special-purpose devices that take the role server device in a client-server model of application use.

The file server 140 includes a processor, program and data memory, and mass storage for recording and retrieving data in a file system. In a preferred embodiment, the file server 140 is disposed for receiving and responding to file server requests using the communication network. The file server requests can use either the CIFS file server protocol (and accordingly, an NT file system model) or the NFS file server protocol (and accordingly, a Unix file system model). In alternative embodiments, other file server protocols and file system models may be supported.

Backup and Restore Capability

Figure 2:
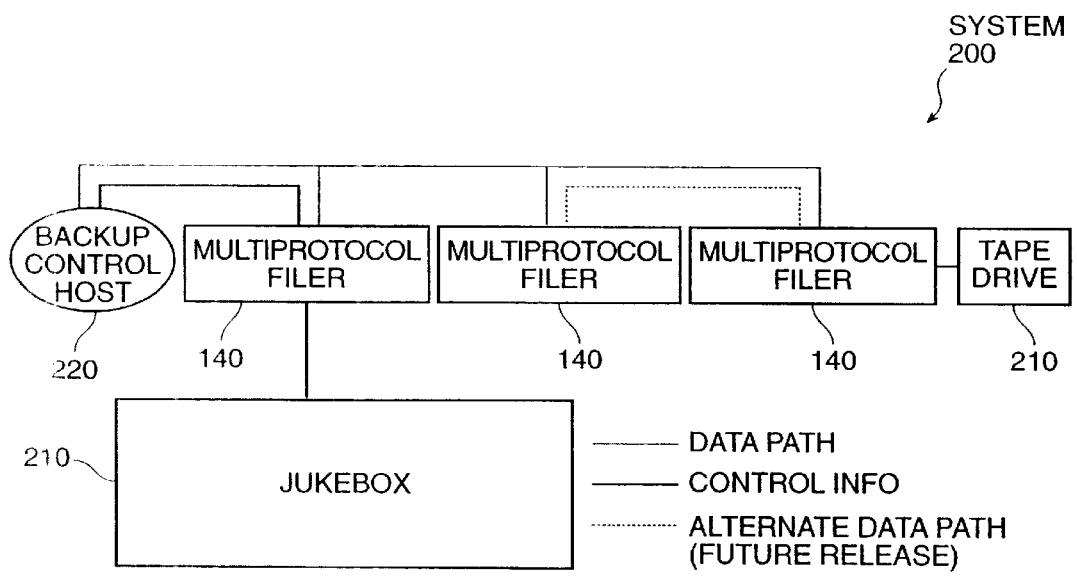
FIG. 2 shows a block diagram of a file server system providing backup and restore capability in a heterogeneous environment.

FIG. 2 shows a block diagram of a file server system providing backup and restore capability in a heterogeneous environment.

A system 200 includes a set of file servers 140, a set of backup storage devices 210, and a backup control device 220.

In a preferred embodiment, the file servers 140 are as described with regard to FIG. 1. In alternative embodiments, the file servers 140 may include single protocol file servers 140 or multi-protocol file server 140 that support only some of the protocols and file system models described herein.

The backup storage devices 210 are coupled to the file servers 140 using the communication network 110, and are disposed for recording and retrieving backup information from the file servers 140.

In a preferred embodiment, the backup storage devices 210 can include one or more magnetic, magneto-optical, or optical disks in a "jukebox" configuration.

In a first set of alternative embodiments, the backup storage devices 210 can include one or more tape drives or other mass storage devices. In a second set of alternative embodiments, the backup storage devices 210 can include a set of file servers 140 disposed for acting in a backup and restore capacity.

The backup control device 220 is coupled to at least some of the file servers 140 using the communication network 110, and is disposed for controlling those file servers 140 for backup and restore operations.

Method of Operation

Figure 3:
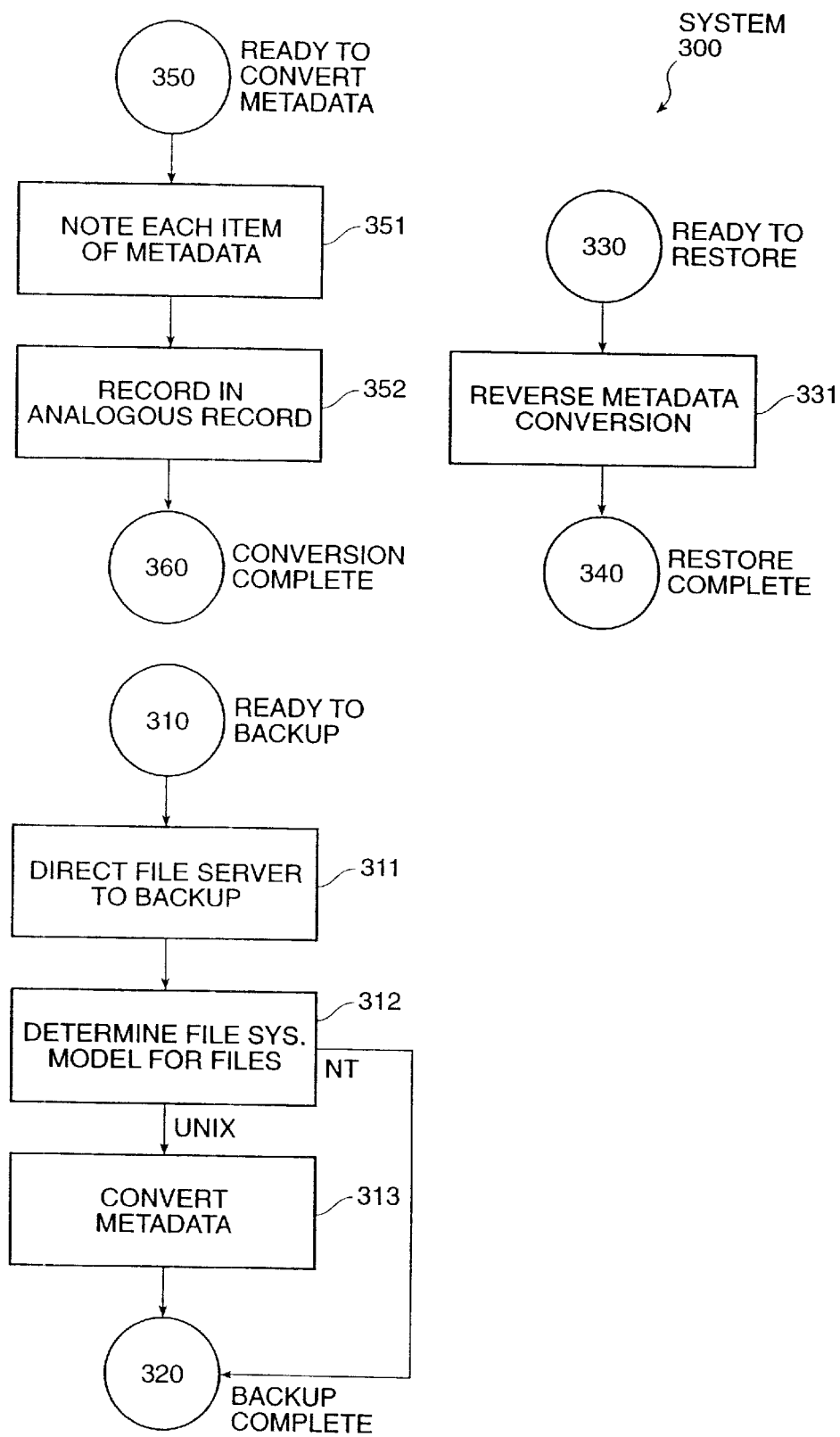
FIG. 3 shows a process flow diagram of a method of operation for a file server system providing backup and restore in a heterogeneous environment.

FIG. 3 shows a process flow diagram of a method of operation for a file server system providing backup and restore in a heterogeneous environment.

A method 300 is performed by the system 100 operating in conjunction, including a set of file servers 140, the backup storage device 210, and the backup control device 220.

File Metadata

The method 300 operates to preserve file metadata across backup and restore operations.

File metadata includes information pertinent to each file, not already included in the file data (the file data is typically the contents of the file). For example, file metadata can include one or more of the following:
- one or more names for the file;
- access control information for the file, such as (a) Unix "permissions" bits, and related bits such as the "use-owner-permissions" bit, or (b) Unix group identifiers or owner identifiers for the file;
- linking information for the file, such as (a) a whether the file is a symbolic link or a Unix "hard" link, or (b) the target file or Unix inode for the link; or
- other possible metadata for the file, such as timestamps for when the file was last read from or written to.

The scope and spirit of the invention are not limited to these specific examples. Those skilled in the art will recognize, after perusal of this application, that other and further information about a file may be considered file metadata in embodiments of the invention.

In a preferred embodiment, to perform metadata-conversion, the file server 140 performs the following steps:

At a flow point 350, the file server 140 is ready to perform a metadata-conversion operation for a selected file.

At a step 351, the file server 140 notes each item of metadata associated with the selected file.

At a step 352, the file server 140 records each item of metadata in an analogous record using the NT file system model. In a preferred embodiment, the file server 140 records each item of metadata as an NT Extended Attribute for use by an NT backup element.

In alternative embodiments, the file server 140 may record each item of metadata using other aspects of the NT file system model. For example, the file server 140 may use one or more of the following techniques:
- The file server 140 may create one or more associated files with special names or including the associated metadata;
- The file server 140 may insert a header or footer in the file to record the items of metadata; and
- The file server 140 may create a new NT data stream specific to the purpose of recording and retrieving the items of metadata.

At a flow point 360, the metadata-conversion operation is complete for the selected file.

As described herein, the metadata-conversion operation is performed as part of the backup function.

Backup Function

At a flow point 310, the system 100 is ready to perform a backup function.

At a step 311, the backup control device 220 directs one of the file servers 140 to perform a backup operation.

At a step 312, the file server 140 determines the file system model for files in its file system (or subset of its file system) for which the backup control device 220 directed it to perform the backup operation. If the file system model for any particular file is the NT file system model, no special processing of file metadata occurs for that file. If the file system model for any particular file is the Unix file system model, the file server 140 performs the step 313, at which it performs the metadata-conversion operation described with regard to flow point 350.

At a step 313, the file server 140 performs the metadata-conversion operation described with regard to flow points 350 through 360.

In a preferred embodiment, the metadata-conversion operation is transparent to NT backup and restore elements. This allows NT backup and restore elements that were created without reference to the heterogeneous file server environment to be used without substantial change.

The metadata-conversion operation is somewhat different If the file from the Unix file system is actually a Unix hard link. Windows NT backup and restore utilities are not programmed to properly handle multiple file names referring to the same file. Accordingly, for Unix hard links, the metadata-conversion operation saves sufficient information to allow NT backup utilities to backup the file, and to allow the Unix hard link to be reconstructed after operation of NT restore utilities.

In a preferred embodiment, when the file is a Unix hard link, the metadata-conversion operation tracks references to those files (by reference to the particular Unix inode), and converts all references except the first to hard links. The metadata-conversion operation adds NT Extended Attributes sufficient to identify the hard links upon restore.

At a flow point 320, the backup function is complete.

Restore Function

At a flow point 330, the system 100 is ready to perform a restore function.

At a step 331, the file server 140 reverses the backup operation, including the metadata-conversion operation performed in the step 313.

Those skilled in the art will recognize, after perusal of this application, how to reverse the metadata-conversion operation described with regard to flow points 350 through 360. The file server 140 can determine those items of metadata recorded during the metadata-conversion operation, retrieve those items of metadata for each selected file, and record those items of metadata for the file using the Unix file model.

At a flow point 340, the restore function is complete.

Other Utilities

It will be clear to those skilled in the art, after perusal of this application, that the invention has wide applicability, and is not limited to backup and restore functions.

For example, the invention may be used in conjunction with other programs that are used to copy files or directories, in which it is advantageous to preserve metadata associated with those files or directories. The invention is particularly advantageous when it is desired to use software utilities that do not recognize the metadata to be preserved.

Generality of the Invention

The invention has wide applicability to other operations in a multi-protocol file server. For example, the invention may be used with one or more of the following other techniques:

- The invention may be used to record items of metadata from the NT file system model in the Unix file system model, and to retrieve those items of metadata for restoring files using the NT file system model. This would allow use of Unix backup and restore elements in addition to or instead of NT backup and restore elements.
- The invention may be used in conjunction with inventions described in the following application:
  - application Ser. No. 09/037,652, filed Mar. 10, 1998, in the name of inventor Steven Kleiman, titled "Highly Available File Servers,".

This application is hereby incorporated by reference as if fully set forth herein.

- The invention may be used to backup and restore system records and other items of metadata not specifically associated with any particular file. These system records may include file system structure information, process control information, and other information relevant to operation of the file server 140.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A file server,
   said file server disposed for recording and retrieving each one of a set of files in one of a plurality of data storage and retrieval models; wherein said data storage and retrieval models include Unix/NFS and NT/CIFS;
   each one of said data storage and retrieval models disposed for including metadata with at least some of said files;
   said file server including a backup element disposed for preserving said metadata for retrieval associated with said files even when said files are recorded by said backup element in one of said data storage and retrieval models other than associated with said files.

2. A file server as in claim 1, wherein said backup element records said metadata as an NT Extended Attribute for use by an NT backup element.

3. A file server as in claim 1, wherein said backup element records said metadata in an analogous record using a data storage and retrieval model other than associated with said files.

4. A file server as in claim 1, wherein said file server includes an element disposed for translating between Unix metadata and NT Extended Attributes transparently to a set of NT backup and restore elements.

5. A file server as in claim 1, wherein said metadata includes at least one of
   Unix permission bits;
   ownership or group identifiers;
   timestamp information; and
   file link information.

6. A file server as in claim 1, wherein
   said metadata includes file link information; and
   said backup element distinguishes between hard links and symbolic links.

7. A file server as in claim 1,
   including a restore element disposed for recovering said metadata associated with said files even when said files are recorded by said backup element in one of said data storage and retrieval models other than associated with said files;
   wherein said restore element retrieves said metadata from said analogous record and records said metadata using a data storage and retrieval model associated with said files.

8. A file server as in claim 7, wherein
   said metadata includes file link information; and
   said restore element maintains connectivity specified by hard links in said set of files.

9. A method of operating a file server, said method including steps for
   recording and retrieving each one of a set of files in one of a plurality of data storage and retrieval models; wherein said data storage and retrieval models include UNIX/NFS and NT/CIFS;
   including metadata with at least some of said files in each one of said data storage and retrieval models;
   performing a backup operation, including steps for preserving said metadata for retrieval associated with said files even when said files are recorded by said backup element in one of said data storage and retrieval models other than associated with said files.

10. A method as in claim 10, including steps for maintaining connectivity specified by hard links in said set of files.

11. A method as in claim 10, including steps for
    recovering said metadata associated with said files even when said files are recorded by said backup element in one of said data storage and retrieval models other than associated with said files;
    wherein said steps for recovering include steps for retrieving said metadata from said analogous record, and steps for recording said metadata using a data storage and retrieval model associated with said files.

12. A method as in claim 10, including steps for translating between Unix metadata and NT Extended Attributes transparently to a set of NT backup and restore elements.

13. A method as in claim 10, wherein said steps for preserving include steps for recording said metadata in an analogous record using a data storage and retrieval model other than associated with said files.

* * * * *